United States Patent [19]
Slater

[11] Patent Number: 5,943,128
[45] Date of Patent: Aug. 24, 1999

[54] GRATING-BASED OPTICAL PROBE

[75] Inventor: Joseph B. Slater, Dexter, Mich.

[73] Assignee: Kaiser Optical Systems, Ann Arbor, Mich.

[21] Appl. No.: 09/105,723

[22] Filed: Jun. 26, 1998

Related U.S. Application Data

[60] Provisional application No. 60/051,175, Jun. 27, 1997.

[51] Int. Cl.⁶ .............................. G01J 3/44; G01N 21/64; G01N 21/65
[52] U.S. Cl. ........................ 356/301; 356/318; 250/458.1
[58] Field of Search ...................................... 356/301, 318, 356/317, 417; 250/458.1, 459.1, 461.1, 461.2

[56] References Cited

U.S. PATENT DOCUMENTS

| | | | |
|---|---|---|---|
| 5,011,284 | 4/1991 | Tedesco et al. | 356/301 |
| 5,377,004 | 12/1994 | Owen et al. | 356/301 |
| 5,442,438 | 8/1995 | Batchelder et al. | 356/301 |

*Primary Examiner*—F. L. Evans
*Attorney, Agent, or Firm*—Gifford, Krass, Groh, Sprinkle, Anderson & Citkowski, PC

[57] ABSTRACT

A dispersive grating, preferably in the form of a volume-phase holographic optical element, or HOE, is used as a beam combiner in an optical measurement probe of the type used to analyze induced radiative effects such as Raman or fluorescence detection. Although a reflective grating may be used, a transmission grating of holographic derivation is used in the preferred embodiment. Although the grating may define an area substantially equivalent to the cross-section or aperture of the collection path, a grating which consumes a fraction of the collection aperture may instead be utilized, thereby allowing collected light to pass around the grating to further enhance the efficiency of detection. As a further advantageous option, the grating may be fabricated with 'power,' that is, with the capability of collimating excitation energy that has been focused onto the grating surface. In this manner, a "spot" grating may be positioned centrally along the axis of the collection path, thereby realizing the multiple advantages of relaxed alignment demand, reduced spurious scattering, and high efficiency and throughput.

23 Claims, 2 Drawing Sheets

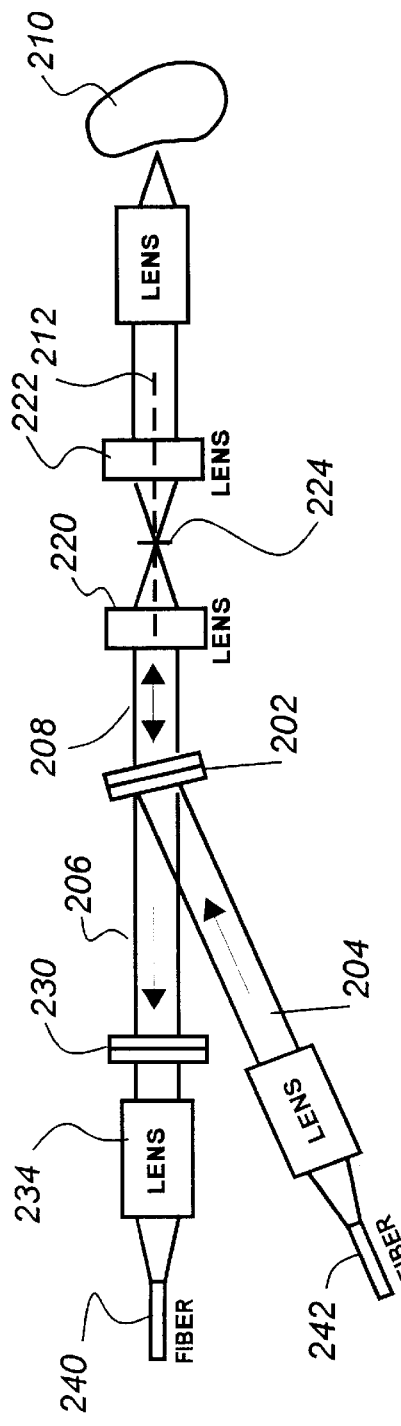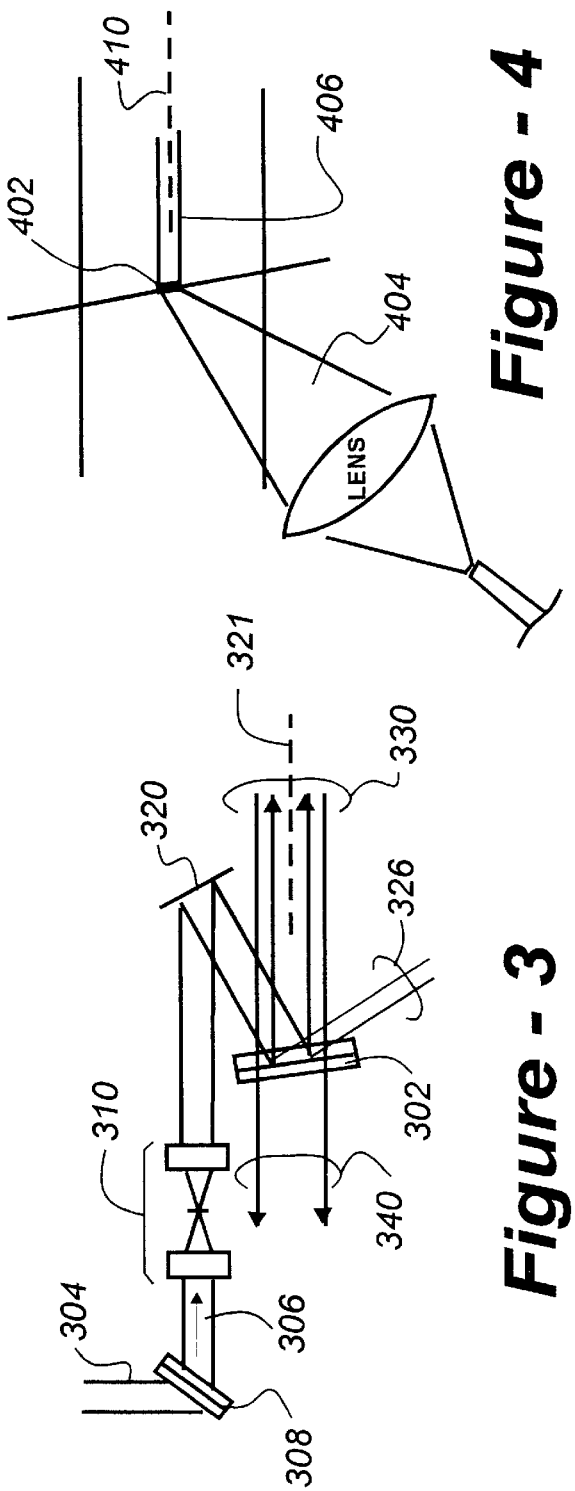

GRATING-BASED OPTICAL PROBE

REFERENCE TO RELATED APPLICATION

This application claims priority of U.S. provisional application Serial No. 60/051,175, filed Jun. 27, 1997, the entire contents of which are incorporated herein by reference.

FIELD OF THE INVENTION

This invention relates generally to radiative analysis techniques such as Raman and fluorescence detection and, in particular, to configurations wherein an optical grating is utilized to merge a source of excitation into a collection path as part of a folded optical probe geometry.

BACKGROUND OF THE INVENTION

Induced radiative effects such as Raman and fluorescence detection have become extremely useful tools in materials investigation. In a typical optical arrangement used in such an application, a source of excitation energy, typically a beam from a laser, is directed toward a sample to be characterized, and the light emitted by the sample is collected along a collection path, detected, and analyzed using a spectrograph.

Depending upon the configuration, it is often advantageous to combine or fold the excitation energy into the collection path, thereby enabling common optics to be utilized in conjunction with focusing the excitation onto, or into, the sample, and collecting or collimating the spectrum received therefrom. Such a configuration is commonly used in a Raman or fluorescence microscope arrangement, for example.

Heretofore, a holographically derived narrowband filter or notch filter has been utilized as a beam combiner in probes of this type, that is, for the purpose of folding the excitation energy into the collection path. In a Raman microprobe application, for instance, a holographic beamsplitter in the form of a notch filter is now used to replace the dielectric elements previously employed for this purpose. The narrowband filter is typically designed to operate at an acute angle of incidence, and delivers in excess of 90 percent of the incident excitation energy through the objective optic, while transmitting in excess of 80 percent of the wavelength-shifted light emitted by the sample in the direction toward the detector. Various probe head configurations of this type are set forth in commonly assigned U.S. Pat. No. 5,377,004, the content of which is also incorporated herein by reference.

Using holography, highly efficient notch filters may be fabricated as volume-phase optical elements, which comprise recorded fringes of periodically varying refractive index (RI) at least several wavelengths deep in the material. Such structures may be conformal, with the fringes being substantially parallel to the surface of the material, to create a volume reflection optical element, or substantially perpendicular or tilted with respect to the surface of the material, to realize a transmissive device.

One advantage of using a notch filter in a beam-combining spectroscopic application, is that notch filters can now be fabricated with extremely narrowband properties, resulting in a very precise introduction of the excitation into the combined path as a function of laser wavelength. However, being so accurate, beam combiners of this type, including non-holographic reflective dielectric or metallic mirrors, demand extreme physical alignment within a very narrow range of physical tolerance. In addition, particularly in the case of holograms, thicker materials are used to realize narrow notch properties, resulting in background fluorescence and other undesirable spurious scatter caused by the excitation of internal structures.

SUMMARY OF THE INVENTION

The present invention overcomes the disadvantages of utilizing a narrowband reflective element as a beam combiner in an optical measurement probe through the use of a dispersive grating, preferably in the form of a volume-phase holographic optical element, or HOE. Although a reflective grating may be used according to the one embodiment of the invention, in the preferred embodiment, a transmission grating is used.

The advantage of a grating is that it is substantially less sensitive to misalignment than is a narrowband reflector, including those of holographic derivation. In addition, the material used to produce holographic transmission gratings is substantially thinner than that used to produce holographic notch filters and, hence, exhibits correspondingly less spurious background fluorescence. Throughput is also enhanced as there is less absorption loss of the collected spectra in the return path intended for detection. The level of noise associated with the excitation coupled into the collection path is also reduced, since unwanted source energy including forward-scattered light propagates in the opposite direction to the collection path. In contrast, with the use of a relative notch filter, forward-scattered light propagates generally toward the collection path and the detection apparatus.

Although the grating according to the invention may define an area substantially equivalent to the cross-section or aperture of the collection path, according to a different embodiment of the invention, a grating which consumes a fraction of the collection aperture is instead utilized, thereby allowing collected light to pass around the grating to further enhance the efficiency of detection. As a further advantageous option, the grating may be fabricated with 'power,' that is, with the capability of collimating excitation energy having been focused near the grating surface. In this manner, a "spot" grating may be positioned centrally along the axis of the collection path, thereby realizing the multiple advantages of relaxed alignment demand, reduced spurious scattering, and high efficiency and throughput.

BRIEF DESCRIPTION OF THE DRAWINGS

FIG. 2 illustrates a preferred embodiment of the invention wherein a holographic transmission grating is utilized as a beam combiner in an optical probe;

FIG. 3 is a simplified drawing which illustrates an alternative embodiment of the invention wherein a reflective grating is used for beam-combining purposes; and FIG. 4 illustrates a further alternative embodiment of the invention wherein a "spot" grating is utilized, preferably recorded with power, to direct a focused excitation beam into a collection path.

DETAILED DESCRIPTION OF THE INVENTION

Figure 1:
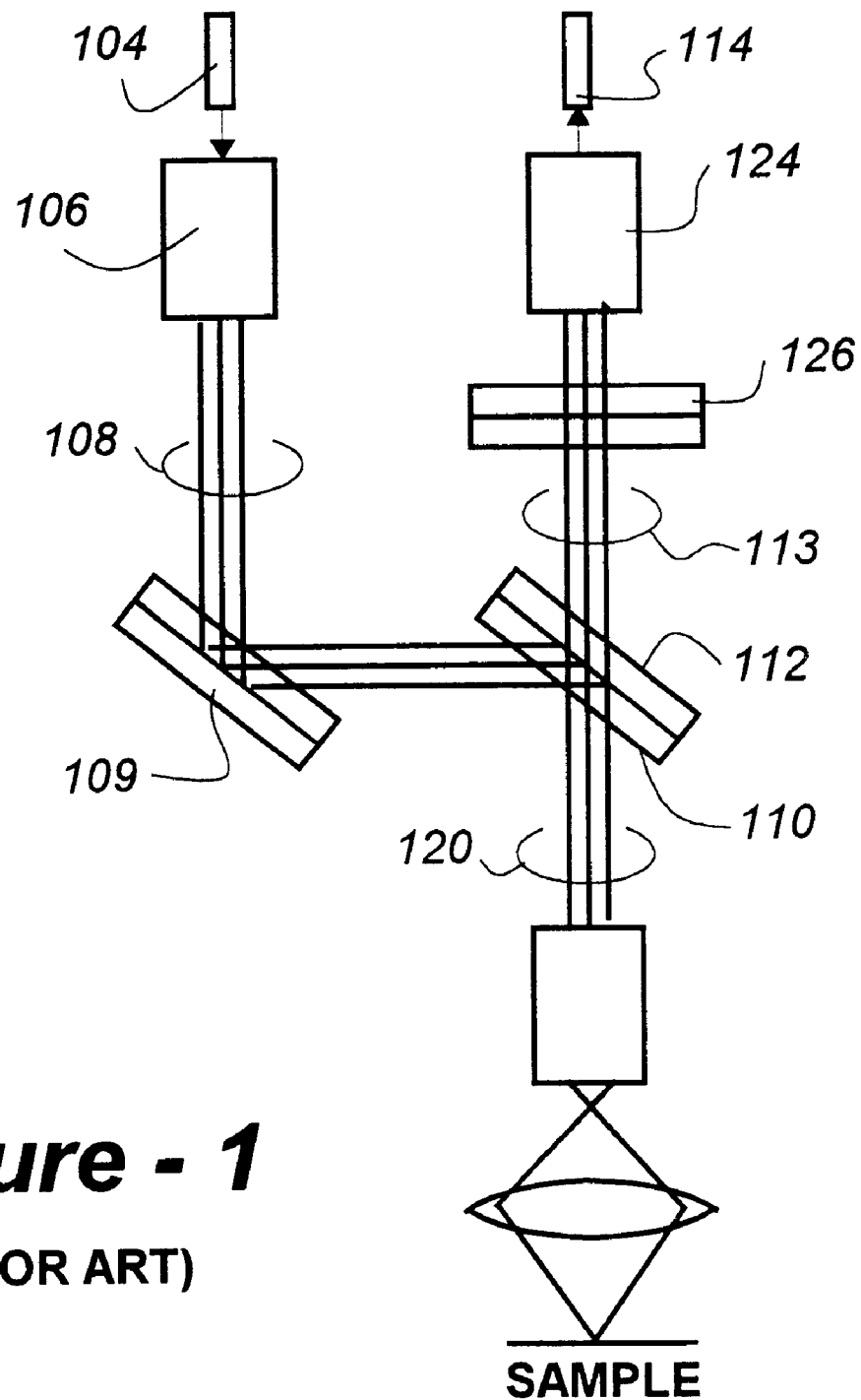
FIG. 1 is a simplified drawing which illustrates optical components in a prior-art probe configuration utilizing a notch filter as a beam-combining element.

Making reference to the drawings, FIG. 1 illustrates a prior-art probe configuration of the type wherein a narrowband reflector is utilized as a combiner in an optical probe, this particular configuration being taken from commonly assigned U.S. Pat. No. 5,377,004, entitled REMOTE OPTICAL MEASUREMENT PROBE, having issued on Dec. 27, 1994. Excitation energy delivered along input fiber 104, is collimated by a lens assembly 106 to create a collimated beam 108. The collimated beam 108 is redirected by element 109 and combined with collection path 113 by narrowband reflective element 112, thereby creating a combined path 120 at least between the narrowband reflector 112 and the sample, with excitation and collected wavelengths counter-propagating with respect to one another.

In this case, narrowband reflective element 112 preferably takes the form of a notch filter as previously described, such that only wavelengths at or substantially close to the laser frequency are reflected and folded into the collection path, whereas all other wavelengths outside of a very narrow range pass through unattenuated, as depicted by the lines 113.

As discussed in the '004 patent referenced above, various configurations may be established in accordance with this basic theme. For example, the device 109 may itself take the form of a notch filter, or a mirror or prism may alternatively be used. In addition, a secondary holographic notch filter 126 may be inserted into the collection path as shown prior to focusing optic 124, to further remove Rayleigh scattering and other instances of laser energy from the collection path, which is delivered by fiber 114 to detection and analysis apparatus suitable to the application.

Now turning to FIG. 2, there is shown an embodiment of the invention wherein, instead of a narrowband reflective element or notch filter, a grating 202 is used to combine a laser beam 204 into a combined collection and excitation path 208 between the grating 202 and the sample 210.

As opposed to the narrowband reflection function of the device described with respect to FIG. 1, the grating 202 passes substantially all wavelengths in both directions, however, only wavelengths substantially at or near the laser line are diffracted along optical axis 212, with non-laser wavelengths being diffracted off-axis and in other directions.

Owing to dispersion, these other wavelengths do not enter into the combined collection and excitation path 208. As a result of this geometry, focusing and collimating lenses 220 and 222 may advantageously be placed in the combined path, on either side of a spatial filter 224, to further ensure that non-laser wavelengths, having been dispersed by grating 202, are filtered out of the combined path in the direction toward the sample 210.

In the light scattered by the sample 210, wavelengths removed from the laser wavelength pass through grating 202 in the counter-propagating direction into the collection path 206. Some fraction of light at the laser wavelength (the Rayleigh scattered light), usually a small fraction, may also pass through the grating 202 in the counter-propagating direction. Consequently, a notch filter 230 is employed in the collection path to prevent Rayleigh scattering and any other scatted light at the laser wavelength from entering the focusing optic 234. In the case of a remote probe configuration, optical fibers 240 and 242 may be used to carry excitation to the probe head, and deliver collected spectra therefrom, though it will be appreciated that the invention is equally applicable to "direct" or non-fiber-based delivery and/or return geometries.

FIG. 3 illustrates an alternative embodiment of the invention wherein, instead of a transmission grating, a reflection grating 302 is instead used as a beam combiner. Laser excitation delivered along beam 304 is redirected along path 306, either by a reflective element or dispersive element such as the grating 308 shown, in which case a spatial filter arrangement 310 may conveniently and advantageously be used to further clean up the excitation. An optional beam redirecting element such as mirror 320 is used to direct the excitation onto the reflection grating 302, preferably implemented as a volume-phase HOE, as in the case of FIG. 2, such that only energy at or substantially near the laser line is diffracted along optical axis 321 toward the sample (not shown) being investigated. Other wavelengths outside of the laser line are diffracted off of the optical axis 321, and therefore do not form part of combined path 330 or collection path 340. Accordingly, an arrangement consisting of lenses and spatial filter of the type shown in FIG. 2 may also be used in this case to further ensure that only laser energy impinges upon the sample. Optical fibers and other lenses and optional components are omitted from this drawing for the sake of clarity.

In the prior art configurations using reflective holographic or dielectric notch filters as the beam combining element, the incident and reflected light makes equal and opposite angles with respect to the surface normal of the notch filter. This is a result of the above-mentioned conformal nature of the notch filters, in which the reflective layers that make up the filter are parallel to the surfaces of the filter. Consequently, reflections from the external surfaces of the filter, which may include wavelengths other than the laser wavelength, will also be directed into the combined collection and excitation paths. Although the reflectivity of the external surfaces may be low, in particular if antireflection (AR) coatings are utilized, these surface reflections are nevertheless undesirable and can contribute to the system noise level.

Furthermore, a conformal element such as the notch filter does not have dispersive properties. A reflective grating, by way of contrast, has dispersive properties which are achieved by using tilted fringes in the case of volume phase holographic gratings. In this case, the incident and diffracted wavefronts do not make equal angles with respect to the surface filter. Consequently, the reflections from the external surfaces of the grating propagate in a direction 326 that cannot be the same as the optical axis 321 of the combined path 330. Therefore, the performance of the configuration using a reflection grating will not be degraded by surface reflections from the combining element 302.

Now turning to FIG. 4, there is shown a further alternative of the embodiment wherein a spot grating 402 consumes only a portion of the aperture of the collection path, thereby improving efficiency by not having all of the return collected spectra received from the sample pass through element 402. Although a small cross-section collimated laser beam may be utilized, resulting in a redirected and substantially collimated excitation source being folded into the collection path, a focused laser beam such as 404 may alternatively be utilized, and by recording the device 402 to have optical, or focusing power, a substantially collimated beam 406 may nevertheless be realized as exiting from device 402, having been diffracted thereby.

As yet a further alternative, in the event that power is not added to the spot device 402, resulting in a redirection of a focused beam along optical axis 410, a spatial filter or pinhole may be placed precisely at the point where the rays of the focused laser beam cross at the optical axis, thereby essentially combining a spot grating and spatial filter into a common optical arrangement. It should be noted that FIG. 4 is even further simplified as compared to FIGS. 3 and 2, assuming the reader understands which other optical devices may, or may not, be incorporated into the configuration depending upon the application at hand.

I claim:

1. An optical probe, comprising:
   a source of excitation energy directed to a sample to induce an emission spectrum therefrom along a collection path having an optical axis; and
   a dispersive optical grating supported in the collection path to receive excitation energy from the source and redirect the excitation energy toward the sample at a predetermined angle into the collection path along the optical axis.

2. The optical probe of claim 1, wherein the grating is a volume-phase holographic grating.

3. The optical probe of claim 2, wherein the grating is a holographic transmission grating.

4. The optical probe of claim 2, wherein the grating is a holographic reflection grating.

5. The optical probe of claim 1, wherein the collection path defines an aperture, and wherein the optical grating consumes a only a portion of the aperture.

6. The optical probe of claim 5, wherein:
   the source of excitation energy is focussed onto the optical grating; and
   the optical grating is recorded with power to collimate the received excitation energy.

7. The optical probe of claim 1, wherein the emission spectrum is representative of Raman scattering.

8. The optical probe of claim 1, wherein the emission spectrum is representative of fluorescence scattering.

9. The optical probe of claim 1, further including one or more optical fibers to deliver the excitation energy from the source to the probe, to carry the emission spectrum along the collection path, or to perform both functions.

10. An optical probe, comprising:
    a laser outputting a beam at a nominal wavelength;
    means for directing the beam to a sample so as to induce an emission spectrum therefrom along a collection path having an optical axis,
    the means for directing the laser beam to the sample including a dispersive optical grating supported in the collection path,
    the grating being operative to receive excitation energy from the source and redirect the excitation energy at a predetermined angle into the collection path along the optical axis.

11. The optical probe of claim 10, wherein the grating is a volume-phase holographic grating.

12. The optical probe of claim 11, wherein the grating is a holographic transmission grating.

13. The optical probe of claim 11, wherein the grating is a holographic reflection grating.

14. The optical probe of claim 10, wherein the collection path defines an aperture, and wherein the optical grating consumes a only a portion of the aperture.

15. The optical probe of claim 14, wherein:
    the source of excitation energy is focussed onto the optical grating; and
    the optical grating is recorded with power to collimate the received excitation energy.

16. The optical probe of claim 10, wherein the emission spectrum is representative of Raman scattering.

17. The optical probe of claim 10, wherein the emission spectrum is representative of fluorescence scattering.

18. The optical probe of claim 10, further including one or more optical fibers to deliver the excitation energy from the source to the probe, to carry the emission spectrum along the collection path, or to perform both functions.

19. In an optical analysis arrangement of the type wherein a source of excitation energy is merged with a counter-propagating collection path containing sample spectrum, the improvement comprising:
    an optical grating having a first surface to receive excitation energy from the source and a second surface from which the excitation emerges into the counter-propagating collection path.

20. In an optical analysis system of the type wherein a source of excitation is merged with a counter-propagating collection path containing sample spectrum, the improvement comprising:
    a dispersive optical grating supported in the collection path, the grating being constructed to receive excitation energy from the source and redirect the excitation energy at a predetermined angle into the collection path toward the sample.

21. The improvement of claim 20, wherein the grating is a volume-phase holographic grating.

22. The improvement of claim 20, wherein the grating is a holographic transmission grating.

23. The improvement of claim 20, wherein the grating is a holographic reflection grating.

* * * * *